(12) United States Patent
Janssen et al.

(10) Patent No.: US 6,367,299 B1
(45) Date of Patent: *Apr. 9, 2002

(54) KEY ASSEMBLY FOR VEHICLE IGNITION LOCKS

(75) Inventors: David C. Janssen, Whitefish bay; Brian J. Reetz, Thiensville, both of WI (US)

(73) Assignee: Strattec Security Corporation, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/457,984

(22) Filed: Dec. 9, 1999

Related U.S. Application Data

(60) Division of application No. 08/503,429, filed on Jul. 17, 1995, now Pat. No. 6,035,677, which is a continuation-in-part of application No. 08/112,094, filed on Aug. 26, 1993, now Pat. No. 5,433,096.

(51) Int. Cl.$^7$ .............................................. E05B 19/04
(52) U.S. Cl. .................... 70/278.3; 70/395; 70/408; 70/413
(58) Field of Search ...................... 70/408, 395, 413, 70/276, 277, 278.1, 278.2, 278.3, 278.4, 278.5, 278.6, 278.7, 279.1, 283.1

(56) References Cited

U.S. PATENT DOCUMENTS

| 917,894 A | 4/1909 | Pusterla ........................ 70/408 |
| 3,347,072 A | 10/1967 | Rose |
| 3,392,559 A | 7/1968 | Hedin et al. |
| 3,579,183 A | 5/1971 | Lipschutz ..................... 340/52 |
| 3,660,624 A | 5/1972 | Bell ............................ 200/44 |
| 3,689,885 A | 9/1972 | Kaplan et al. ............... 340/152 |
| 3,732,465 A | 5/1973 | Palmer ........................ 317/134 |
| 3,752,960 A | 8/1973 | Walton ...................... 235/61.11 |
| 3,786,659 A | 1/1974 | Elder et al. .................... 70/395 |
| 3,859,624 A | 1/1975 | Kriofsky et al. ............... 340/38 |
| 3,883,629 A | 5/1975 | Garner et al. .................. 264/55 |
| 3,964,024 A | 6/1976 | Hutton et al. ................ 340/152 |
| 4,142,674 A | 3/1979 | Walton ........................ 235/492 |
| 4,176,782 A | 12/1979 | Fukuda et al. ............... 235/449 |

(List continued on next page.)

FOREIGN PATENT DOCUMENTS

| DE | 2614310 | 10/1977 | .................. 70/408 |
| EP | 0351183 | 1/1990 | .................. 70/277 |
| EP | 0401541 | 12/1990 | |
| EP | 559160 | 9/1993 | |
| EP | 648589 | 4/1995 | |
| EP | 0713944 A1 | 5/1996 | |
| FR | 2411290 | 8/1979 | .................. 70/408 |
| GB | 2039321 | 8/1980 | .................. 70/408 |
| GB | 2155988 | 10/1985 | .................. 70/395 |
| GB | 2158870 A | 11/1985 | |
| GB | 2187227 | 9/1987 | |
| JP | 60-199622 | 10/1985 | |
| JP | 2-20780 | 1/1990 | |
| JP | 4011179 | 1/1992 | .................. 70/395 |
| JP | 4038382 | 2/1992 | .................. 70/413 |
| JP | 4080482 | 3/1992 | .................. 70/277 |
| JP | 4093481 | 3/1992 | .................. 70/277 |
| WO | WO88/00635 | 1/1988 | |
| WO | WO95/32348 | 11/1995 | |

*Primary Examiner*—Lloyd A. Gall
(74) *Attorney, Agent, or Firm*—Reinhart Boerner Van Deuren, S.C.

(57) ABSTRACT

A key assembly for mounting an electronic component in the head of the key. The electronic component is mounted in either an opening such as a bore or recess formed in the key head, or a carrier connected to the heel end of the key shank. In the former case, a closure member such as a plug or adhesively backed panel member is employed to close off the opening. In the latter case, the carrier is encapsulated within a plastic key head.

13 Claims, 13 Drawing Sheets

U.S. PATENT DOCUMENTS

| | | | |
|---|---|---|---|
| 4,189,712 A | 2/1980 | Lemelson | 340/149 |
| 4,192,400 A | 3/1980 | McEwan | 180/287 |
| 4,200,227 A | 4/1980 | Lemelson | 235/382 |
| 4,250,533 A | 2/1981 | Nelson | 361/172 |
| 4,262,632 A | 4/1981 | Hanton et al. | 119/1 |
| 4,267,494 A | 5/1981 | Matsuoka et al. | 318/568 |
| 4,291,237 A | 9/1981 | Kitano | 307/10 |
| 4,297,569 A | 10/1981 | Flies | 235/443 |
| 4,298,792 A | 11/1981 | Granholm et al. | 235/375 |
| 4,326,125 A | 4/1982 | Flies | 235/443 |
| 4,327,353 A | 4/1982 | Beard et al. | 340/64 |
| 4,337,462 A | 6/1982 | Lemelson | 340/572 |
| 4,361,153 A | 11/1982 | Slocum et al. | 128/419 |
| 4,366,466 A | 12/1982 | Lutz | 340/64 |
| 4,415,893 A | 11/1983 | Roland et al. | 340/825.31 |
| 4,420,794 A | 12/1983 | Anderson | 361/419 |
| 4,435,649 A | 3/1984 | Vandigriff | 307/10 |
| 4,438,426 A | 3/1984 | Adkins | 340/64 |
| 4,471,343 A | 9/1984 | Lemelson | 340/571 |
| 4,532,932 A | 8/1985 | Batty, Jr. | 128/631 |
| 4,603,563 A | 8/1986 | Mochida et al. | 70/276 |
| 4,663,952 A | 5/1987 | Gelhard | 70/278 |
| 4,712,398 A | 12/1987 | Clarkson et al. | 70/276 |
| 4,726,205 A | 2/1988 | Allerdist et al. | 70/408 X |
| 4,738,334 A | 4/1988 | Weishaupt | 180/287 |
| 4,748,834 A | 6/1988 | Herriott | 70/413 |
| 4,848,115 A | 7/1989 | Clarkson et al. | 70/276 |
| 4,868,409 A | 9/1989 | Tanaka et al. | 307/10.5 |
| 4,922,736 A | 5/1990 | Tanaka et al. | 70/395 X |
| 4,936,896 A | 6/1990 | Takatsuka | 70/413 X |
| 4,947,662 A | 8/1990 | Imedio | 70/395 |
| 4,998,952 A | 3/1991 | Hyatt, Jr. et al. | 70/395 |
| 5,003,801 A | 4/1991 | Stinar et al. | 70/278 |
| 5,005,393 A | 4/1991 | Ewalds et al. | 70/277 |
| 5,012,236 A | 4/1991 | Troyk et al. | 340/825.54 |
| 5,029,459 A | 7/1991 | Almblad | 70/408 X |
| 5,038,590 A | 8/1991 | Sawyer et al. | 70/408 X |
| 5,084,699 A | 1/1992 | DeMichele | 340/825.54 |
| 5,095,309 A | 3/1992 | Troyk et al. | 340/825.54 |
| 5,111,199 A | 5/1992 | Tomoda et al. | 340/825.72 |
| 5,117,097 A | 5/1992 | Kimura et al. | 70/278 X |
| 5,121,102 A | 6/1992 | Stricklin, Jr. | 340/521 |
| 5,195,341 A | 3/1993 | Nieuwkoop | 70/278 |
| 5,307,658 A | 5/1994 | Kokubu et al. | 70/427 |
| 5,311,757 A | 5/1994 | Spahn | 70/408 |
| 5,337,588 A | 8/1994 | Chhatwal | 70/408 X |
| 5,351,042 A | 9/1994 | Aston | 340/825.31 |
| 5,433,096 A | 7/1995 | Janssen et al. | 70/408 X |
| 5,592,169 A | 1/1997 | Nakamura et al. | 341/173 |
| 5,632,168 A | 5/1997 | Yano | 70/278 |
| 5,727,408 A | 3/1998 | Mizuno et al. | 70/408 X |
| 5,732,579 A | 3/1998 | D'Hont et al. | 70/395 X |
| 5,775,148 A | 7/1998 | Layton et al. | 70/408 |
| 6,035,677 A * | 3/2000 | Janssen et al. | 70/278.3 |
| 6,164,101 A * | 12/2000 | Kito et al. | 70/408 X |

\* cited by examiner

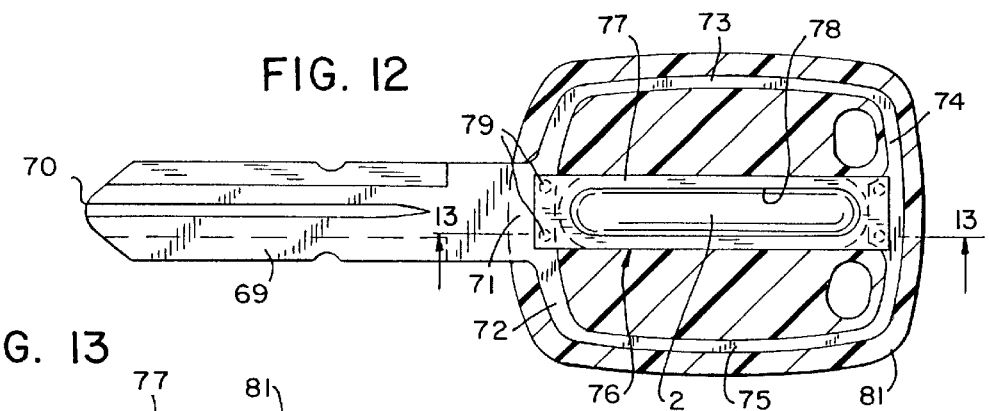
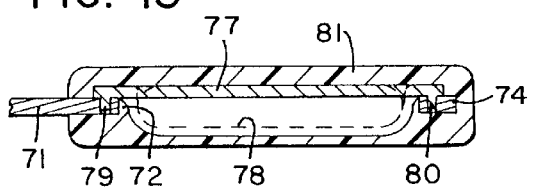
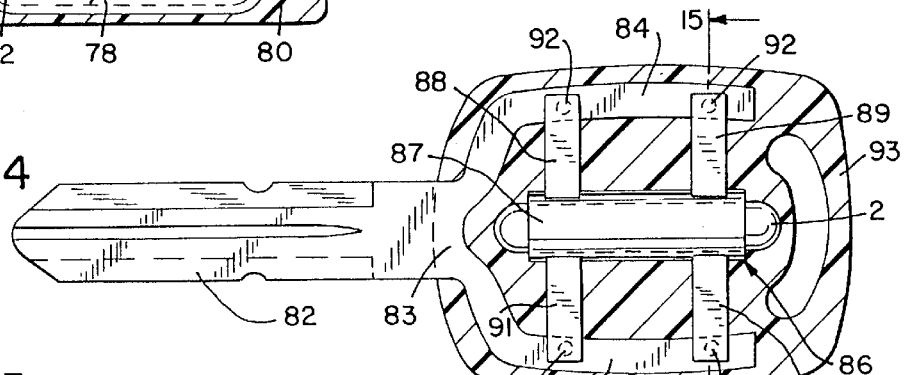
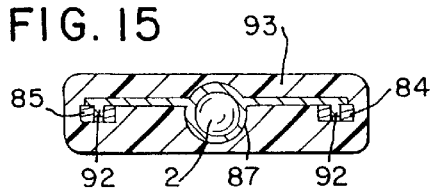
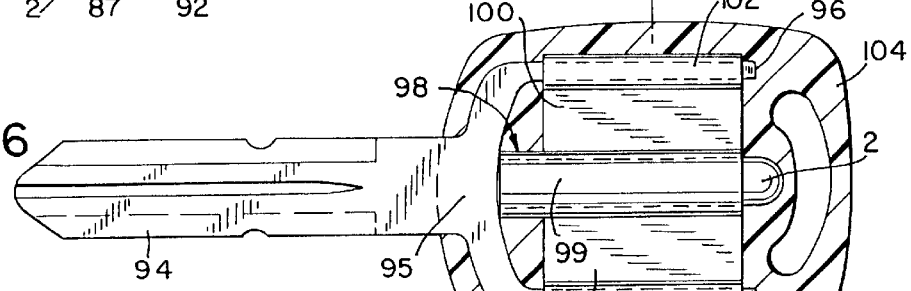
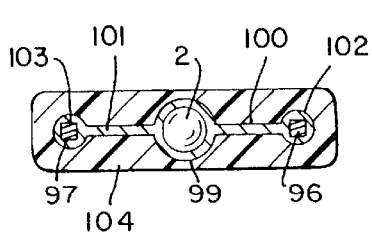

FIG. 18
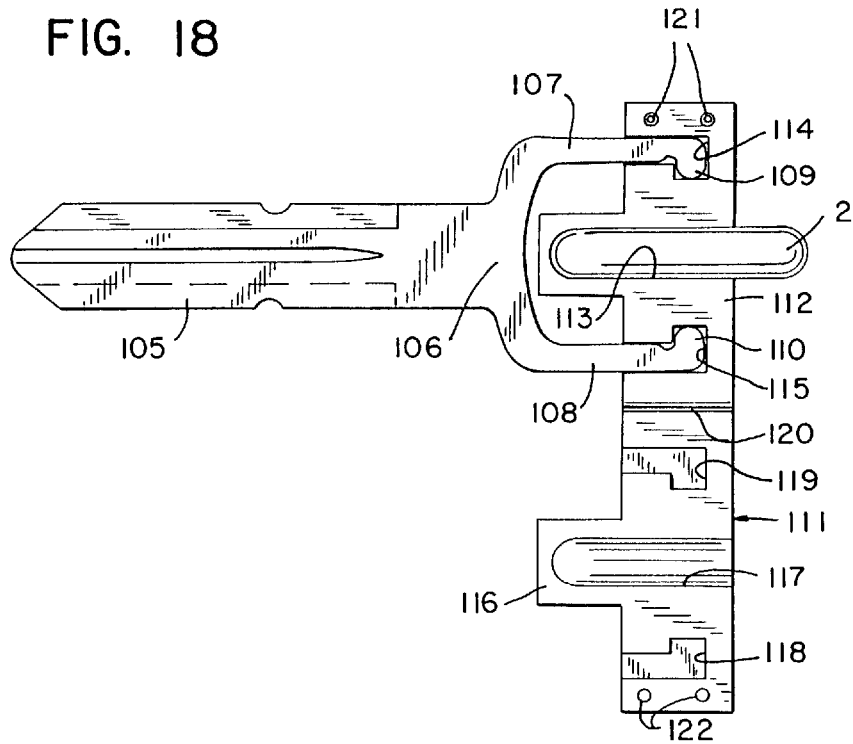
FIG. 19
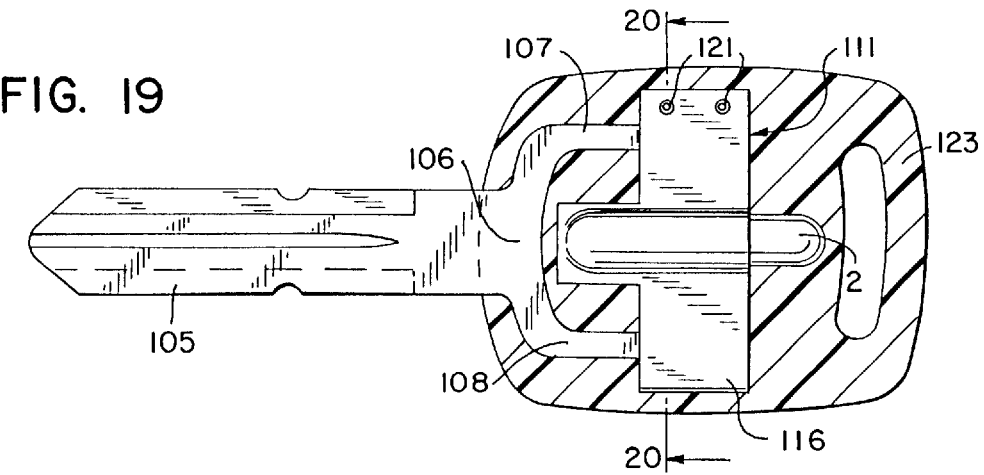
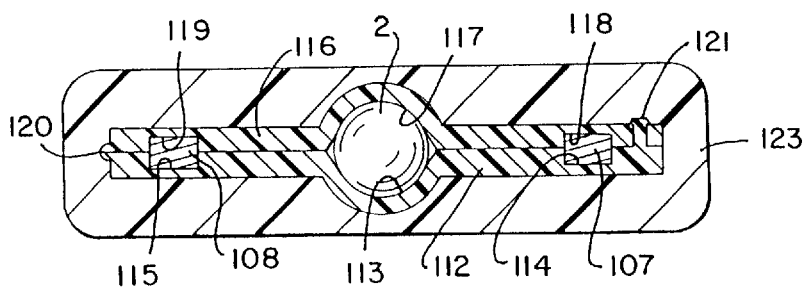
FIG. 20

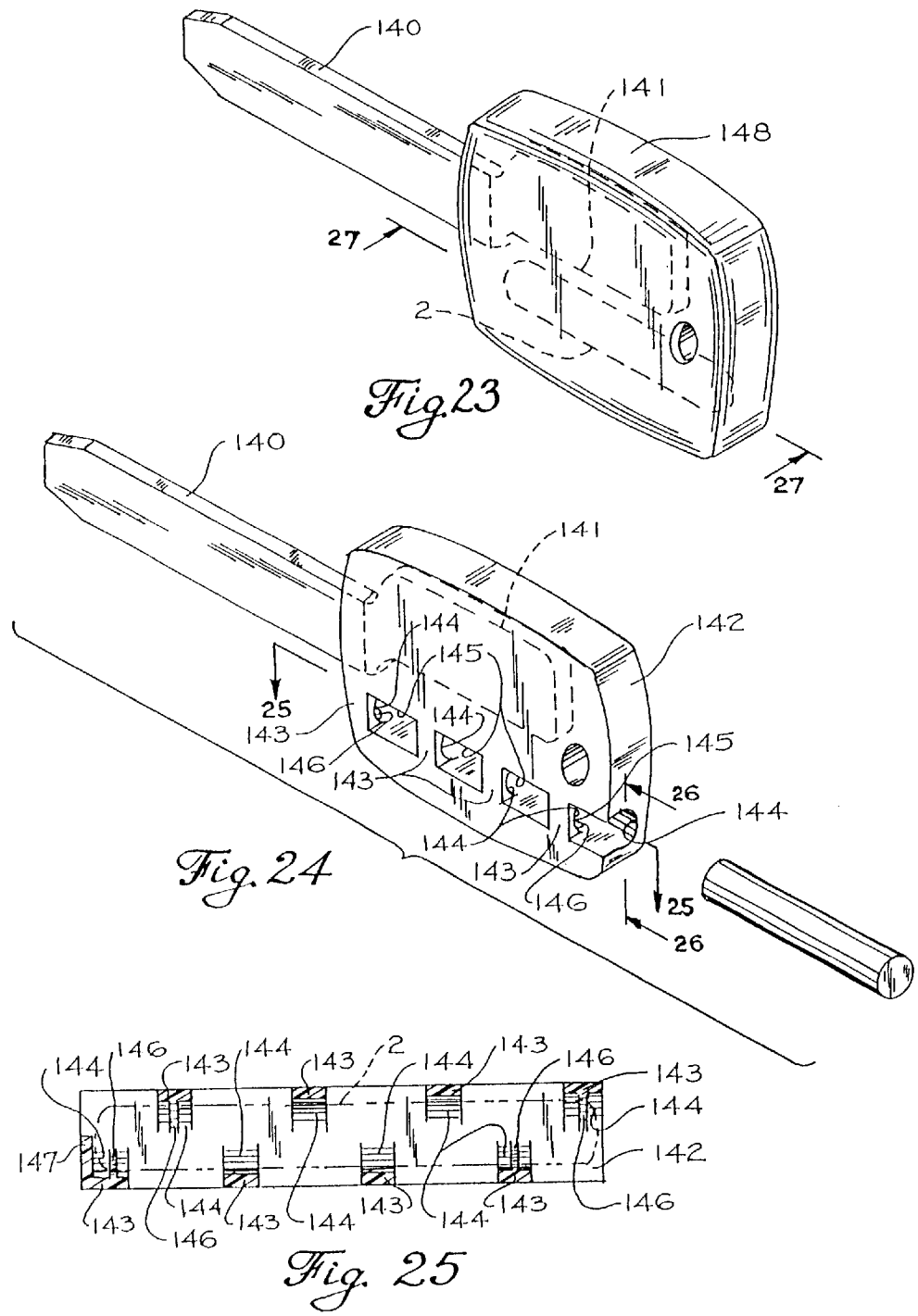

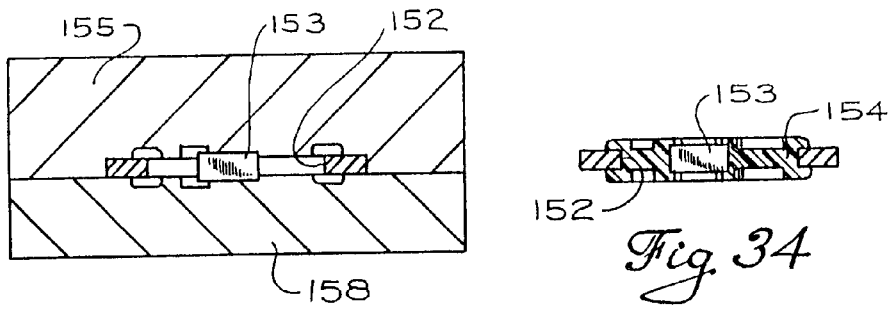
Fig. 33
Fig. 34
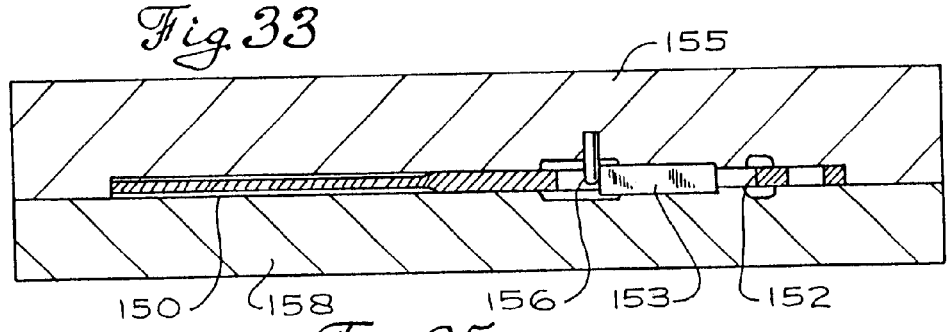
Fig. 35
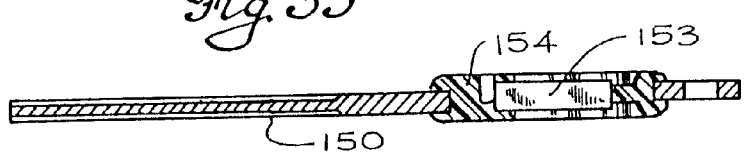
Fig. 36
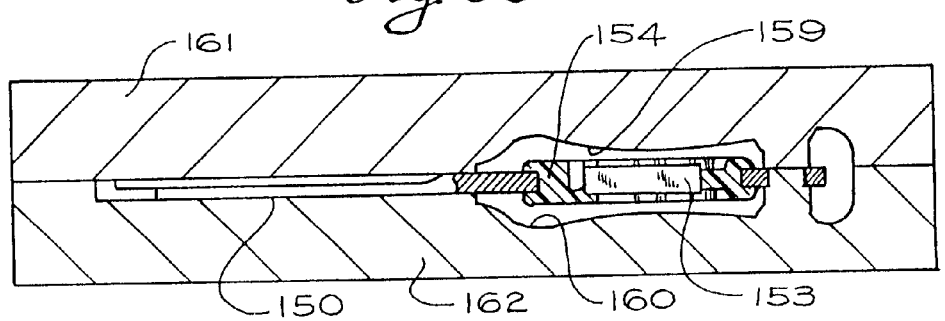
Fig. 37
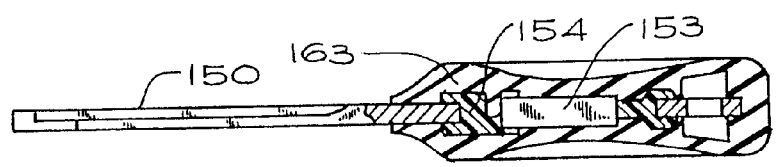
Fig. 38

KEY ASSEMBLY FOR VEHICLE IGNITION LOCKS

This application is a divisional of copending application Ser. No. 08/503,429, filed on Jul. 17, 1995, now U.S. Pat. No. 6,035,677, which is a continuation-in-part of application Ser. No. 08/112,094, filed Aug. 26, 1993 now U.S. Pat. No. 5,433,096.

BACKGROUND OF THE INVENTION

The present invention relates to vehicle keys, and more particularly, to a key assembly for use in an automobile steering column ignition and lock unit.

Various types of locks for use in connection with the ignition circuit of an automobile are known in the art. Many of such locks include anti-theft and/or anti-tampering mechanisms which are incorporated to deter unauthorized use of automobiles. Increasingly popular with the automotive industry is an electronic interlock operating in connection with the automobile ignition lock. An electronic interlock system uses a coded signal to enable starting of the automobile. Presently, the coded activation signal is read either electronically or optically within the ignition lock, and is subsequently sent to an electronic control module which controls engine operation based on whether a correct signal is received. Hence, an electronic interlock does not allow the lock to be bypassed or "hot wired", or pulled in order to start the automobile. As a result, automobile theft is more time consuming and difficult.

The keys employed with electronic interlock systems contain both mechanical and electronic interlock codes. One such system incorporates the use of a resistor pellet in an ignition key. The pellet provides for a resistor of known resistance so that upon insertion and rotation of the key in an automobile's ignition cylinder unit an electrical current is applied to and through the resistor. A decoding circuit performs a resistance comparison between the resistor in the pellet in the key and a known resistance "window". If the resistance is within the window, the automobile may be started. If the resistance does not match, the automobile will not start. Examples of such interlock systems and keys for use therewith are illustrated in U.S. Pat. No. 4,250,482, 5,083,362, and 5,156,032.

In another electronic interlock system an optical code in employed to control engine operation. currently, optical codes are in the from of a plurality of hole combinations physically formed in the key. The optical code is formed by utilizing a combination of large and small holes, read by the reader, and subsequently converted into an electronic signal. The activation signal is then sent in the electronic control module of the engine to enable ignition. As a result, a key having an erroneous hole combination will neither enable the ignition system nor start the automobile.

In still another electronic interlock system, there is utilized radio frequency identification (RFID) to enable or disable engine operation. An RFID interlock system consists of a reader which sends a power pulse to an antenna which in turn generates an electromagnetic field. This field energizes a small transponder mounted in the key, which in turn transmits a unique identification code back to the reader via the antenna where it is decoded. If the signal sent by the transponder is a valid identification code, the reader transmits this information to the automobile's electronic control module which in turn enables engine operation. However, if the signal is invalid, the reader transmits this information to the electronic control module which then prevents engine startup. Typically, the antenna generates a relatively high energy RF field which is received by a coil in the transponder, converted to DC voltage and used to supply the transponder's electronic circuitry. The transponder's circuitry in turn transmits its unique identification code in the form of a low energy electromagnetic RF field which is received by the antenna and is in turn decoded by the reader as described above.

SUMMARY OF THE INVENTION

The present invention relates to a key assembly and more particularly to the mounting of an electronic component in the key. The electronic component is preferably a transponder for an RFID electronic interlock system for an automobile ignition lock, and preferably the transponder is mounted in the head of the key.

One aspect of the invention relates to mounting the electronic component in an opening formed in the key head, and utilizing a closure member to close off the opening. In one embodiment, the opening comprises a bore adapted to receive the electronic component and a plug for closing off the opening. Preferably, the bore is orientated in alignment with the elongated shank of the key, and includes a blind end which is spaced from the key shank. In another embodiment, the opening comprises a recess for receiving the electronic component formed in one side of a key head. In this embodiment, the closure member comprises an adhesively backed panel member covering the open top of the recess. In a third embodiment, the opening extends completely through the key head and has a central section for receiving the electronic component together with a pair of opposite panel-receiving outer sections opening to opposite sides of the key head. The outer sections are then closed off by a pair of adhesively backed panel members in a manner similar to the second embodiment except that the electronic component is sandwiched between the first and second panel members. In a fourth embodiment, the keyhead comprises a base member and a cover member, the opening comprises a recess formed in one of these two members, and the closure member comprises the other of the two members. In this embodiment, the base member and cover member are attached together so that the electronic component is sandwiched between the base member and cover member. Preferably, the attachment is in the form of a snap lock assembly. Also, the base member and cover member may either be separate or may be hinged together if desired.

In another aspect of the invention, the mounting arrangement includes a carrier connected to the heel end of the key shank. The heel end of the key shank includes an open frame member which either encircles the carrier or is U-shaped with the carrier attached to opposite sides of the frame member. In one form, the carrier comprises a flat base, a recess formed in the base for receiving the electronic component and attachment means for attaching the base to the frame member. Preferably, the carrier orientates the electronic component in alignment with the elongated key shank. When the heel end of the key shank is U-shaped, the carrier may comprise a hollow cylindrical base dimensioned in receive the electronic component and wing members extending in opposite directions from the cylindrical base for attaching the carrier to the opposite legs of the frame member. Attachment of the carrier may either be by pins interconnecting the legs of the frame with the carrier, or hollow sleeves for slidably receiving the ends of the legs of the U-shaped frame member. In still another embodiment, the carrier may comprise a flat base, a component receiving recess formed in the base, a pair of leg receiving recesses formed in the base and disposed on opposite sides of the component receiving recess, a cover member cooperating with the base to enclose the component receiving recess, and attachment means for attaching the base and cover together. In this embodiment, the carrier together with the electronic component is molded within a plastic key head. Preferably, the attachment of the base and cover member is by means of a snap lock assembly, and the base and cover members may either be separate or hingedly interconnected with one another.

The present invention thus provides numerous simple and convenient assemblies for mounting an electronic component within the head of a key.

BRIEF DESCRIPTION OF THE DRAWINGS

The drawings illustrate the best mode presently contemplated of carrying out the invention.

In the drawings:

FIG. 12 is a side view with parts in cross section of a sixth embodiment of the key assembly of the present invention;

FIG. 13 is a cross-sectional view taken along the plane of the line 13—13 in FIG. 12;

FIG. 14 is a side view with parts in cross section of a seventh embodiment of the key assembly of the present invention;

FIG. 15 is a cross-sectional view taken along the plane of the line 15—15 in FIG. 14;

FIG. 16 is a side view with parts in cross section of an eighth embodiment of the key assembly of the present invention;

FIG. 17 is a cross-sectional view taken along the plane of the line 17—17 in FIG. 16;

FIG. 18 is a side view of a ninth embodiment of the key assembly of the present invention;

FIG. 19 is a side view with parts in cross section of the key assembly of FIG. 18 with the carrier closed and the key head shown in cross section;

FIG. 20 is a cross-sectional view taken along the plane of the line 20—20 in FIG. 19;

FIG. 23 is a perspective view of an eleventh embodiment of the key assembly of the present invention;

FIG. 24 is an exploded perspective view of the key of FIG. 23 illustrating the manner of assembling a transponder and molded carrier;

FIG. 25 is a cross-sectional view taken along the plane of the line 25–25 in FIG. 24;

FIG. 33 is a cross-sectional view taken along the plane of the line 33—33 in FIG. 32;

FIG. 34 is a cross-sectional view similar to FIG. 33 illustrating the carrier molded in place;

FIG. 35 is a cross-sectional view taken along the plane of the line 35—35 in FIG. 32;

FIG. 36 is a view similar to FIG. 35 except illustrating the carrier molded in place;

FIG. 37 is a cross-sectional view of the mold illustrating the key blank, carrier and transponder within the mold just prior to overmolding;

FIG. 38 is a cross-sectional view illustrating the key head of FIG. 37 after overmolding;

DETAILED DESCRIPTION OF THE PREFERRED EMBODIMENT

Figure 1:
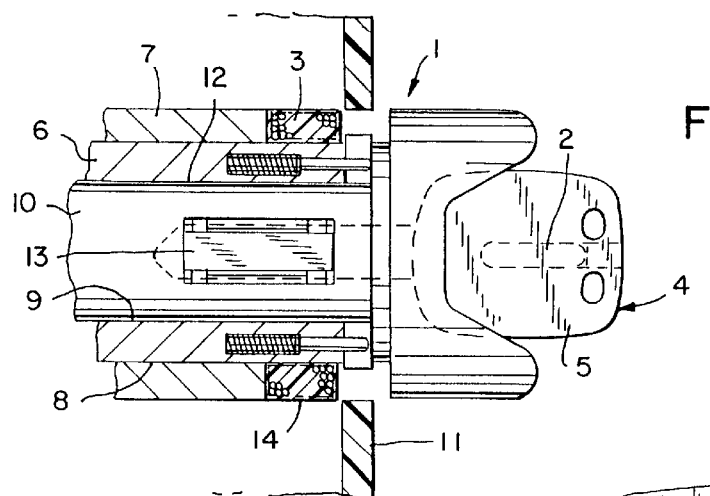
FIG. 1 is a fragmentary side view of an automobile ignition lock incorporating an RFID electronic interlock system.

Referring now to the drawings, FIG. 1 illustrates an automobile ignition lock generally designated by the numeral 1 incorporating an RFID electronic interlock. There are three major components of the RFID interlock, namely, a transponder 2, an antenna 3 and a reader (not shown). The reader is contained within an RFID ignition module (not shown) along with a logic circuit and a control circuit. More specifically, the present invention includes an antenna 3 in the form of a wire coil which generates an RF electromagnetic field in response to a power pulse generated by the reader. The RF electromagnetic field energies transponder 2 contained in key 4, which in turn transmits a unique RF identification code or signal back to the reader via antenna 3. The reader then translates the ID code into a digital form and forwards the digital ID code to the logic circuit which verifies that the ID signal is a valid ID signal. If the signal received is valid, the reader sends an enable signal to the automobile engine control module (not shown) which in turn controls engine operation, e.g., fuel injection, ignition spark, etc. If the ID signal is invalid, the logic circuit sends a reject signal to the control circuit so that engine operation is not enabled. Power for the system is received from the automobile battery (not shown).

Transponder 2 is mounted in head 5 of key 4 and consists of an approximately 3.8×22 millimeter glass encapsulated transponder such as that available from Texas Instruments under Model No. RI-TRP-RRHP-06. Also, instead of the single antenna 3 illustrated in FIG. 1, the system may alternatively contain two coils. i.e. an exciter coil and a receiving coil, such as the type available from Hughes Identification Devices under Model No. IIS51051 hand held reader.

When transponder 2 is to be read, key 4 is inserted into the keyway of ignition lock 1 and turned to close the automobile ignition switch. Battery voltage is thus applied to the engine control module which turns on the RFID ignition module causing the reader to send out a 134.2 KHz power pulse to antenna 3 lasting approximately 50 milliseconds. Antenna 3 thus generates a relatively high energy radio frequency field. This field is received by a coil or antenna (not shown) in transponder 2 that is turned to the same frequency, and converted to DC voltage by a bridge rectifier in transponder 2. This DC voltage is then regulated down, stored in a small capacitor within transponder 2 and used to supply the transponder's electronic circuitry. When the power pulse is finished, the transponder circuitry immediately transmits back a signal that carries the data that is stored within transponder 2, using the energy stored within its capacitor as the power source. The data is a unique factory programmed 64 bit identification code. This circuitry transmits the identification code in the form of frequency shift keying on a low energy electromagnetic field. The modulated ID signal sent by transponder 2 is thus received by antenna 3 and is in turn decoded by the reader by translating the RF signal to a digital ID code or signal and sending the digital code to the logic circuit. The digital signal is then verified as a valid ID code which in turn will enable engine operation or an invalid ID code which will prevent engine operation. Once all data has been sent the storage capacitor within transponder 2 is discharged, thereby resetting transponder 2 in make it ready for the next read cycle. The total read cycle lasts about 120 milliseconds.

Ignition lock 1 includes a hollow cylindrical sleeve 6 which in turn is fixed within a housing 7. Housing 7 may, for example, comprise a steering column of an automobile although it is within the scope of the present invention to mount the lock in any desired location. Sleeve 6 includes a cylindrical outer surface 8 and a cylindrical inner surface 9 which receives an elongated rotatable cylinder 10 therein. As shown, the rearward end of cylinder 10 is to the left in FIG. 1 while the forward end of cylinder 10 is to the right in FIG. 1 adjacent wall 11 of the steering column housing. Cylinder 10 includes a cylindrical outer surface 12 which forms a rotational interface with inner surface 9 of sleeve 6. Cylinder 10 is rotatable by key 4 between an off position and a start position when cylinder 10 is rotated in a clockwise direction from the position shown in FIG. 1. After starting, cylinder 10 rotates in a counterclockwise direction from the start position to a run position, as is conventional. Cylinder 10 includes a plurality of axially spaced tumblers (not shown) engageable with the bits or notches in key 4 to cooperate with a side bar 13 in the conventional manner. Although lock 1 is illustrated as utilizing a construction having side bar 13, the present invention may also be utilized with non-side bar locks, e.g. those using only tumblers for locking engagement between cylinder 10 and sleeve 6.

As shown in FIG. 1, antenna 3 is integrally molded within an annular module 14. Antenna 3 is located at the forward end of sleeve 6 and cylinder 10. This location for antenna 3 provides a desirable position to avoid interference with the electromagnetic field emanating from antenna 3 by the metallic composition of sleeve 6 and cylinder 10. Thus, when assembled on sleeve 6, the wire of antenna 3 is wrapped about sleeve 6 and cylinder 10 to thus form an annular coil having a central opening which is coaxial with the longitudinal axis of lock 1. Module 14 is in the form of an annular ring that may have an inner diameter which is dimensioned to provide a mechanical fit with the outer surface 8 of sleeve 6. Thus, module 14 may be slid over the forward end of sleeve 6 and received within and fixedly mounted on sleeve 6 in any convenient manner. For example, module 14 maybe staked or snapped in place to insure that it is integrally mounted on sleeve 6.

Figure 2:
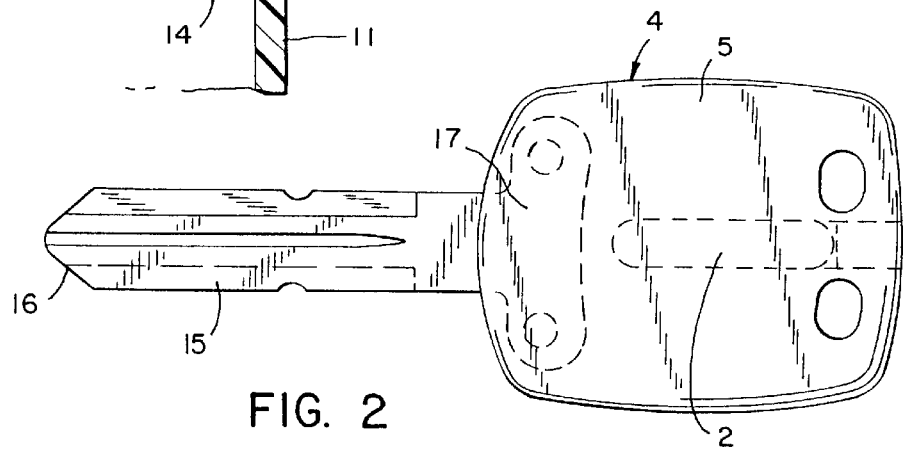
FIG. 2 is an enlarged side view of a first embodiment of a key utilized in the electronic interlock system of FIG. 1.
Figure 3:
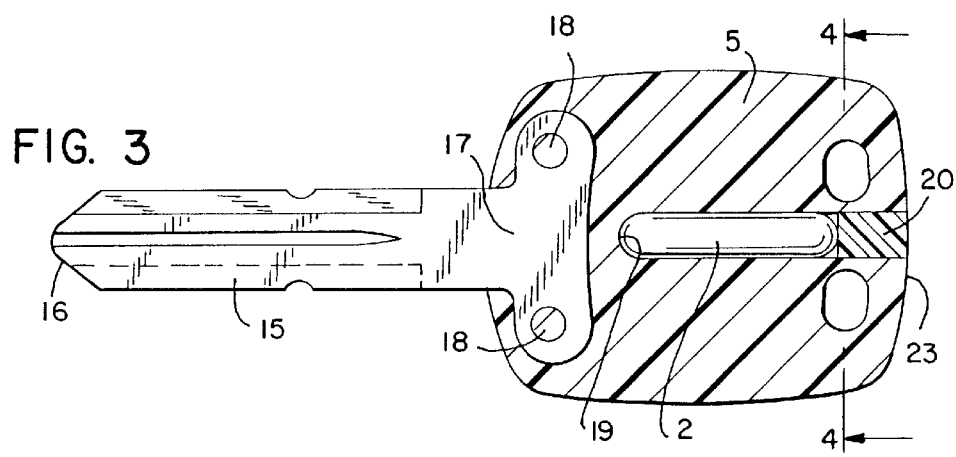
FIG. 3 is a cross-sectional view of the key of FIG. 2.
Figure 4:
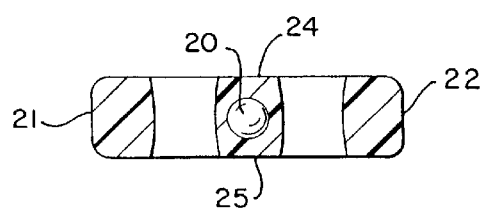
FIG. 4 is a cross-sectional view taken along the plane of the line 4—4 in FIG. 3.

Referring now to FIGS. 2–4, there is illustrated a first embodiment for mounting transponder 2 in key head 5 of key 4. As shown, key 4 includes an elongated shank 15 having a toe end 16 and a heel end 17. Key head 5 is integrally attached to the heel end 17 of shank 15 as by pins 18 which are formed during the molding of head 5. As shown best in FIG. 3, the mounting means for transponder 2 comprises an opening or bore 19 formed in the key head and dimensioned to receive transponder 2, and a closure member or plug 20 adapted to close off bore 19. Bore 19 includes a blind end adapted to engage transponder 2 and an open end opening to one end of key head 5. As shown best in FIG. 3, the blind end of bore 19 is spaced from heel end 17 of shank 15, and the longitudinal axis of bore 19 is in alignment with elongated shank 15. As shown, bore 19 opens to the rear end of key head 5. However, it is contemplated that the open end of bore 19 may open to any surface of key head 5 whether it be top surface 21, bottom surface 22, rear surface 23, or opposite sides 24 and 25. Preferably, plug 20 is composed of the same plastic material as that utilized to form key head 5, such as Polypropylene Himont 7523. A cushioning material such as a silicon compound may also be supplied in the bore 19 when transponder 2 is installed.

Figure 5:
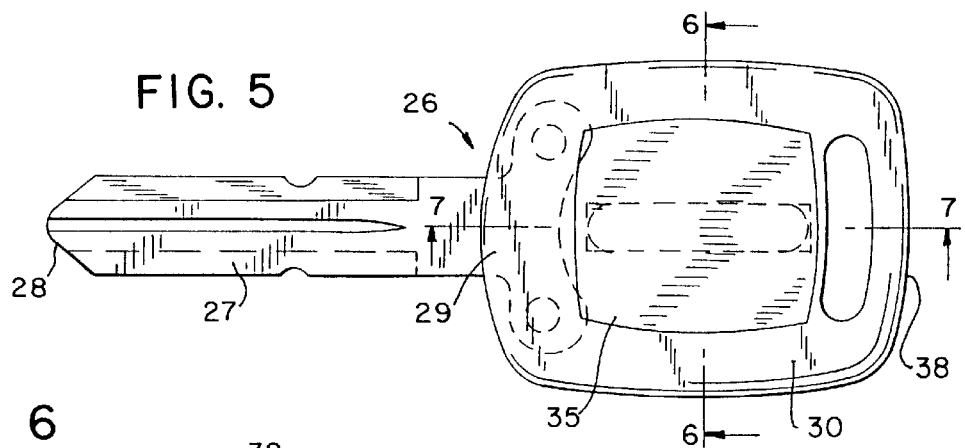
FIG. 5 is a side view of a second embodiment of the key assembly of the present invention.
Figure 6:
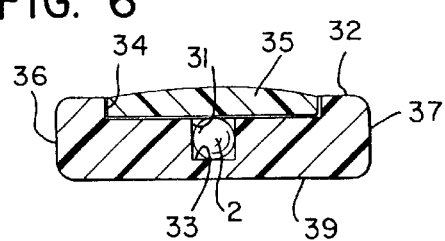
FIG. 6 is a cross-sectional view taken along the plane of the line 6—6 in FIG. 5.
Figure 7:
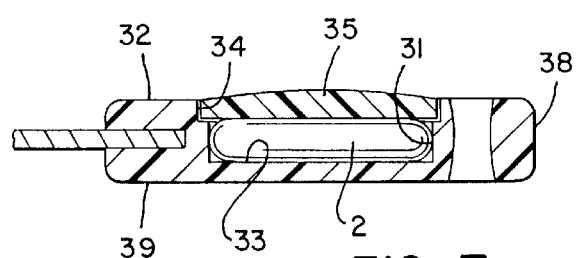
FIG. 7 is a cross-sectional view taken along the plane of the line 7—7 in FIG. 5.

Referring now to FIGS. 5–7, there is illustrated a second embodiment of the key assembly of the present invention wherein a key 26 includes a shank 27 having a toe end 28 and a heel end 29 and a head 30 composed of a plastic material integrally molded on heel end 29 in the same manner as illustrated in FIG. 3. In this second embodiment, however, transponder 2 is mounted within an opening comprising a substantially T-shaped recess 31 formed in one side 32 of key head 30. Recess 31 is dimensioned to receive transponder 2 and in this regard is dimensioned to substantially correspond with the dimensions of transponder 2. A cushioning material such as a silicon compound may also be supplied to the recess 31 when transponder 2 is installed. Recess 31 has a closed bottom end 33 and an open top end 34 opening to side 32 of key head 30. FIG. 6 illustrates closure member 35 as being an adhesively backed panel member which covers transponder 2 and is received within open top 34 to provide a relatively smooth side 32 for key 26. It should be noted that although recess 31 is illustrated as opening toward side 32 of key head 30, it is contemplated that recess 31 could open to any surface of key head 30 including top surface 36, bottom surface 37, rear surface 38 or side surface 39 in addition to side 32. Panel member 35 may be of any desired configuration, but preferably may incorporate a "medallion" or logo of the automobile manufacturer.

Figure 8:
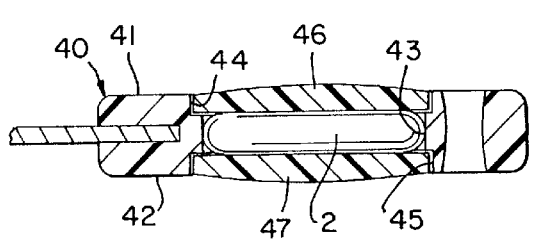
FIG. 8 is a cross-sectional view of a third embodiment of the key assembly of the present invention.

Referring now to FIG. 8 there is illustrated a third embodiment of the key assembly of the present invention. The key assembly of FIG. 8, is substantially identical to the key assembly of FIGS. 5–7 with the exception that the opening for receiving transponder 2 extends completely through key head 40 from one side 41 to its opposite side 42. As shown in FIG. 8, the opening formed in key head 40 includes a central section 43 for receiving the transponder 2 and a pair of opposite outer sections 44 and 45 opening to opposite sides 41 and 42, respectively, of key head 40. A cushioning material such as a silicon compound may also be supplied in section 43 when transponder 2 is installed. In this embodiment, the closure member for the opening extending through key head 40 comprises a pair of adhesively backed panel members 46 and 47 received within outer sections 44 and 45 respectively for covering the opening in key head 40 so that transponder 2 is sandwiched between members 46 and 47. Thus, panel members 46 and 47 may once again include medallions or logos which can be seen from opposite sides 41 and 42 of key head 40.

Figure 9:
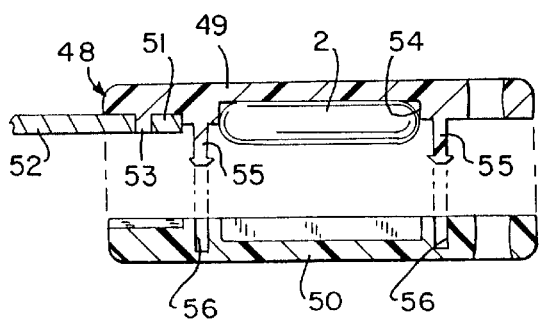
FIG. 9 is an exploded cross-sectional view of a fourth embodiment of the key assembly of the present invention.

Referring now to FIG. 9, there is illustrated a fourth embodiment of the key assembly of the present invention. In this embodiment, the key head, which is generally designated by the numeral 48, is formed in two parts, namely, a base member 49 and a cover member 50. As shown, base member 49 is attached to heel end 51 of key shank 52 via pins 53. The opening for receiving transponder 2 comprises a recess 54 formed in base member 49 dimensioned to correspond with transponder 2 and thereby receive transponder 2 therein. A cushioning material such as a silicon compound may also be supplied in recess 54 when transponder 2 is installed. In this embodiment, the closure member which is adapted to close off the opening for recess 54 comprises the cover member 50 itself. In order to accomplish this, cover member 50 is attached to base member 49 by a snap lock assembly which includes fingers 55 projecting from base member 49 and passageways 56 formed in cover member 50 for receiving fingers 55. Thus, cover member 50 is assembled on base member 49 merely by aligning fingers 55 in passageways 56 and forcing members 49 and 50 together to thereby sandwich transponder 2 therebetween in recess 54. Cover member 50 may also be sonic welded to base member 49, or be adhesively attached together.

Figure 10:
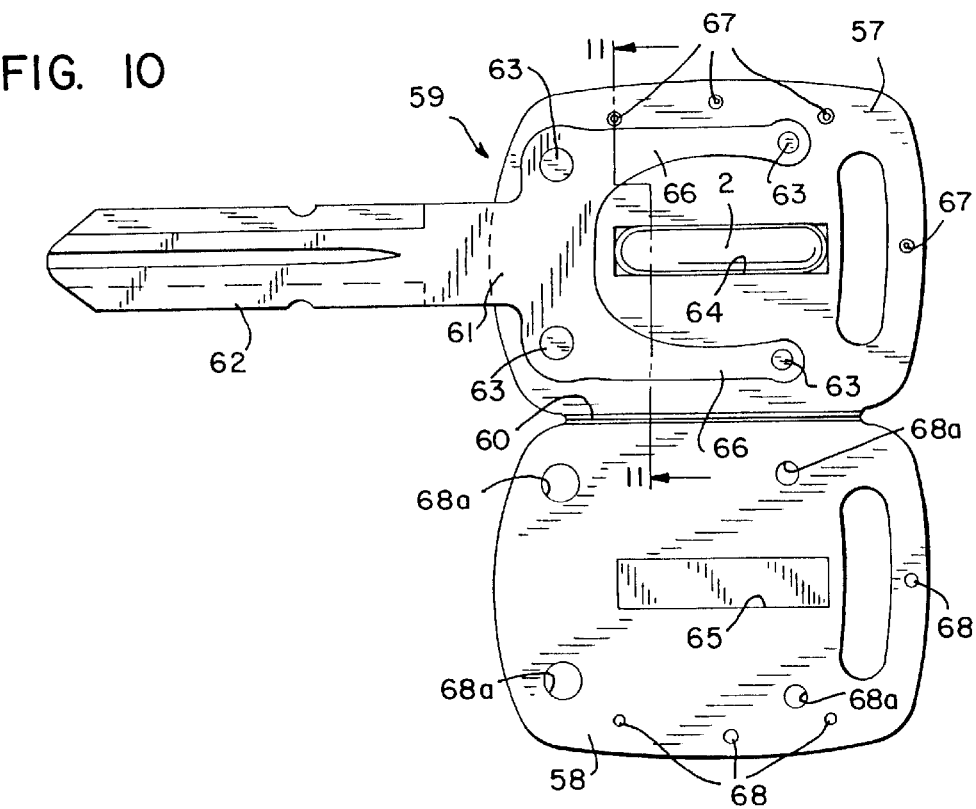
FIG. 10 is a side view of a fifth embodiment of the key assembly of the present invention.
Figure 11:
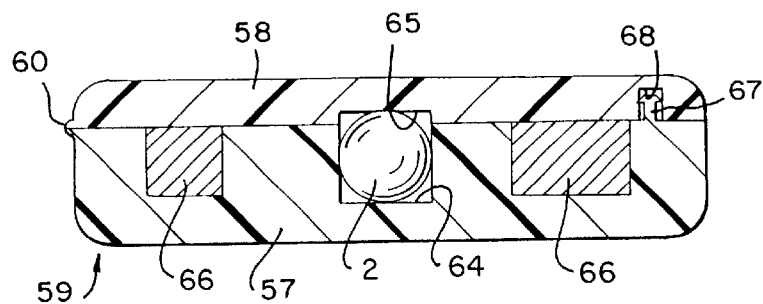
FIG. 11 is a cross-sectional view taken along the plane of the line 11—11 in FIG. 10.

Referring now to FIGS. 10 and 11, there is illustrated a fifth embodiment of the key assembly of the present invention. Essentially, this embodiment is similar to the embodiment of FIG. 9 except base member 57 and cover member 58 of key head 59 are interconnected by means of a living hinge 60 along their bottom edges. Thus, as illustrated, base member 57 is integrally attached to heel end 61 of key shank 62 via pins 63. Heel end 61 comprises a U-shaped frame member having opposite legs 66. Transponder 2 is mounted within a recess 64 formed in base member 57 which, once again, is dimensioned to receive transponder 2. A cushioning material such as a silicon compound may also be supplied in recess 64 when transponder 2 is installed. Transponder 2 is preferably orientated along a longitudinal axis disposed in alignment with key shank 62, and accordingly, a corresponding recess 65 is formed in cover member 58 so that proper alignment of transponder 2 with key shank 62 can be accomplished. As with the embodiment of FIG. 9, base member 57 and cover member 58 are attached together by means of a snap lock assembly comprising a pair of fingers 67 projecting from base member 57 received within passageways 68 formed in cover member 58. Thus, cover member 58 need only be pivoted toward base member 57 until fingers 67 are received within passageways 68 ad pins 63 are received within blind holes 68a so that transponder 2 is sandwiched between members 57 and 58, as shown best in FIG. 11. Cover member 58 may also be sonic welded to base member 57, or they may be adhesively attached together.

Referring now to FIGS. 12 and 13, there is illustrated a sixth embodiment of the key assembly of the present invention. As shown, key shank 69 includes a toe end 70 and a heel end 71. Heel end 71 includes an open rectangular-shaped frame member forming a loop consisting of legs 72–75 which encircles a carrier 76 for transponder 2. Carrier 76 includes a flat base 77, a component receiving recess 78 formed in base 77 and attachment means for attaching base 77 to heel end 71. As shown best in FIG. 13, recess 78 is elongated and dimensioned to substantially match the dimensions of transponder 2 so that transponder 2 is orientated along a longitudinal axis disposed in alignment with the longitudinal axis of key shank 69. As shown best in FIG. 13 the attachment means for attaching base 77 of carrier 76 to the heel end 71 of key shank 69 comprises pins 79 at one end of carrier 76 received within leg 72 and a pair of pins 80 at the opposite end of carrier 76 received within leg 74. Pins 79 and 80 are received within corresponding openings formed in legs 72 and 74 to temporarily mount carrier 76 and transponder 2 to the heel end 71 of key shank 69. Thereafter, key head 81 is integrally molded over heel end 71, legs 72–75, carrier 76 and transponder 2.

Referring now to FIGS. 14–15, there is illustrated a seventh embodiment of the key assembly of the present invention. In this embodiment, key shank 82 includes a heel end 83 which is substantially U-shaped having a pair of opposite spaced-apart legs 84 and 85. In the embodiment, the mounting arrangement for a transponder 2 once again comprises a carrier generally designated by the numeral 86. Carrier 86 comprises a hollow cylindrical base 87 dimensioned to receive transponder 2, and four wing members 88–91 extending from base 87 to attach base 87 and transponder 2 to legs 84 and 85 of heel end 83 of key shank 82. As shown best in FIG. 15, each wing member 88–91 is integral at one end with base 87 and includes a pin 92 at its outer end for interconnection with legs 84 and 85 of the U-shaped frame member or heel end 83. Thus, carrier 86 is mounted on legs 84 and 85 of the U-shaped frame member by inserting pins 92 into corresponding openings in legs 84 and 85 to initially attach carrier 86 and transponder 2 in place. Thereafter, key head 93 is integrally molded over carrier 86, heel end 83, and legs 84 and 85 to affix transponder in position orientated along a longitudinal axis which is in alignment with the longitudinal axis of the key shank 82.

Referring now to FIGS. 16 and 17, there is illustrated an eighth embodiment of the key assembly of the present invention. In this embodiment, key shank 94 includes a heel end 95 which is substantially U-shaped having a pair of opposite spaced-apart legs 96 and 97. In this embodiment, the mounting arrangement for a transponder 2 once again comprises a carrier generally designated by the numeral 98. Carrier 98 comprises a hollow cylindrical base 99 dimensioned to receive transponder 2, and two wing members 100–101 extending base 99 to attach base 99 and transponder 2 to legs 96 and 97 of heel end 95 of key shank 94. As shown best in FIG. 16, each wing member 100–101 is integral at one end with base 99 and includes cylindrical sleeves 102 and 103 respectively for slidably receiving legs 96 and 97 of the U-shaped frame member. Thereafter, key head 104 is integrally molded over heel end 95, carrier 98 and legs 96 and 97 to affix transponder 2 in position orientated along a longitudinal axis which is in alignment with the longitudinal axis of the key shank 94.

Referring now to FIGS. 18–20, there is illustrated a ninth embodiment of the key assembly of the present invention. In this embodiment, key shank 105 once again includes a heel end 106 formed as a substantially U-shaped frame member having a pair of opposite spaced-apart legs 107 and 108. The ends of legs 107 and 108 each include bosses 109 and 110 respectively which are utilized to mount a carrier 111 thereon. Carrier 111 comprises a flat base 112, a component receiving recess 113 formed in base 112, a pair leg receiving recesses 114 and 115 formed in base 112 and disposed on opposite sides of the component receiving recess 113 for receiving legs 107 and 108 as well as bosses 109 and 110. Carrier 111 further includes a cover member 116 which cooperates with bse member 112 to enclose recesses 113–115 and mount transponder 2 therein. Since transponder 2 is orientated along a longitudinal axis disposed in alignment with the longitudinal axis of the elongated key shank 105, it is necessary that cover member 116 also include recesses 117–119 corresponding to recesses 113–115, as is best shown in FIG. 20. Base member 112 and cover member 116 are pivotally connected together by means of hinge 120 extending along their bottom sides. As a means for attaching base member 112 and cover member 116 together to sandwich transponder 2 therebetween, base member 112 includes a pair of projecting pins 121 and cover member 116 includes a pair of corresponding passageways 122 which, as shown best in FIG. 20, provide a snap-lock assembly for interconnecting members 112 and 116. Thereafter, key head 123 may be integrally molded over carrier 111 and legs 107–108 and the heel end 106 of key shank 105 to fixedly secure transponder 2 in its desired location with respect to key shank 105.

Figure 21:
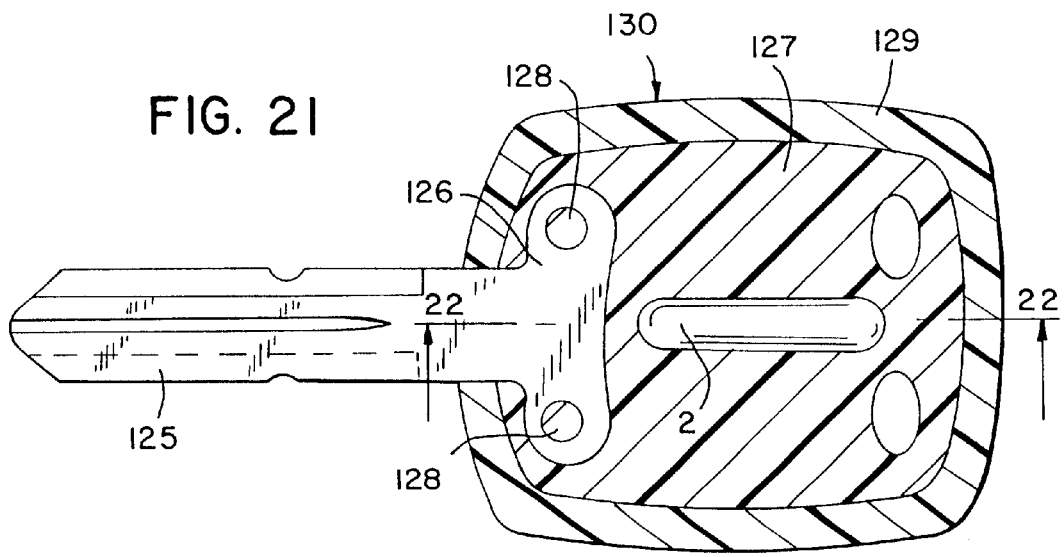
FIG. 21 is a side view with parts in cross section of a tenth embodiment of the key assembly of the present invention.
Figure 22:
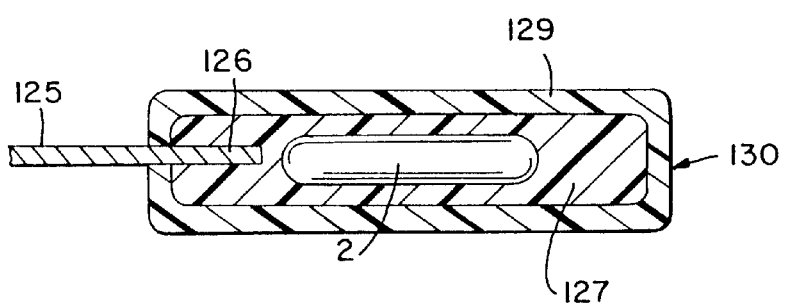
FIG. 22 is a cross-sectional view taken along the plane of the line 22—22 in FIG. 21.

FIGS. 21–22 illustrate a tenth embodiment of the key assembly of the present invention. In this embodiment, key shank 125 includes a heel end 128 integrally attached to a carrier 127 for transponder 2 by pins 128 which are formed during the molding of carrier 127. In other words, carrier 127 is integrally molded around transponder 2 and is simultaneously attached to heel end 126. Thereafter, key shank 125 and carrier 127 with transponder 2 therein are insert molded within an outer shell 129 composed of a plastic material so that shell 129 and carrier 127 from the key head 130. The material for shell 129 may be the same or different from the material for carrier 127.

Figure 26:
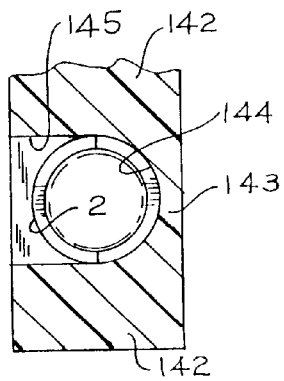
FIG. 26 is a fragmentary cross-sectional view taken along the plane of the line 26—26 in FIG. 24.
Figure 27:
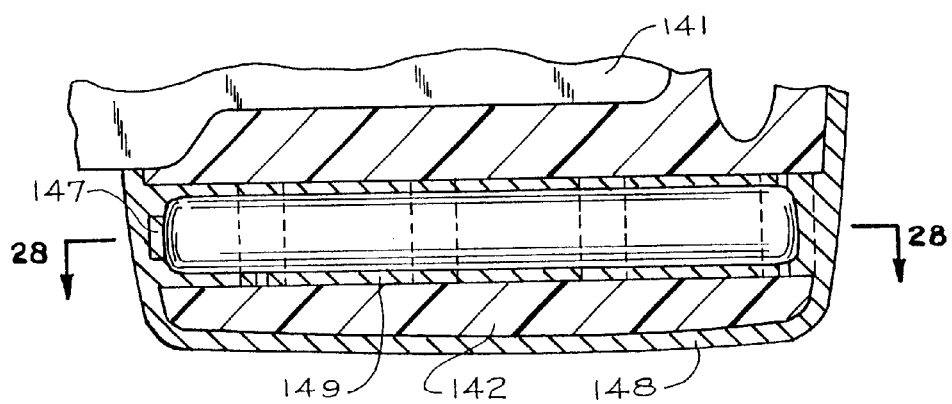
FIG. 27 is a fragmentary cross-sectional view taken along the plane of the line 27—27 in FIG. 23 illustrating the carrier and overmold.

Referring now to FIGS. 23–29 there is illustrated an eleventh embodiment of the key assembly for the present invention. In this embodiment, key shank 140 includes a heel end 141 integrally attached to a carrier 142 for transponder 2 by being molded thereon. In other words, carrier 142 is integrally molded around heel end 141 and during the molding process simultaneously forms a cage for slidably receiving transponder 2, as shown best in FIG. 24. Thereafter, an overmold is formed to surround or encase key shank 140 and carrier 142 with transponder 2 within the cage, as best illustrated in FIG. 27. The plastic material for the overmold as well as carrier 142 may be the same or different, but preferably the carrier is composed of a harder plastic such as polypropylene and the overmold is comprised of a softer material such as a thermoplastic rubber, e.g. Santoprene.

Figure 29:
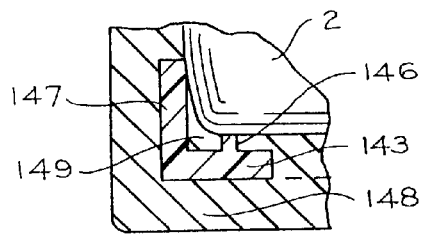
FIG. 29 is an enlarged fragmentary cross-sectional view illustrating a stop for properly positioning the transponder.

The case illustrated in FIG. 24 for transponder 2 is simultaneously formed with carrier 142 and includes a longitudinal opening for receiving transponder 2 which is formed by a plurality of spaced bars 143 each having an outer surface flash with the outer surface of carrier 142 and an inner arcuate surface 144 which conforms to the cylindrical circumference of transponder 2, as shown in FIG. 26. A plurality of openings 145 are formed opposite the arcuate surfaces 144 of each bar 143 in order to accommodate male components of the mold, and to receive the softer overmold material during the overmolding process, as will hereinafter be described. As shown best in FIGS. 24, 25, 28 and 29, the two bars 143 adjacent each end of carrier 142 include a thin flexible membrane integrally formed therewith for engaging transponder 2 and flexibly supporting transponder 2 within carrier 142. Membranes 146 hold transponder 2 in a position spaced inwardly from arcuate surfaces 144 so as to enable the softer overmold material to flow between the outer surface of transponder 2 and arcuate surfaces 144 to provide cushioning for transponder 2, as shown best in FIG. 28. A resilient stop 147 is formed at the end of carrier 142 to engage the end of transponder 2 to ensure that transponder 2 is properly located within the case formed by carrier 142, as best shown in FIG. 29.

Figure 28:
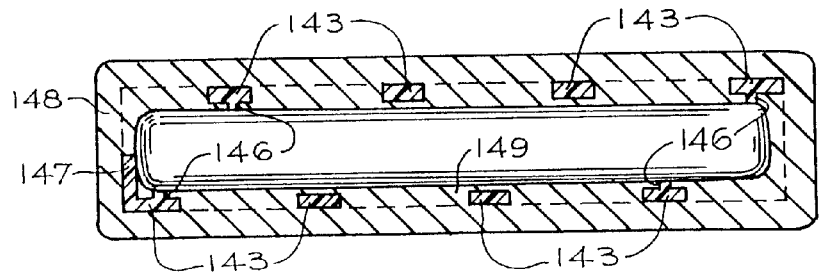
FIG. 28 is a cross-sectional view taken along the plane of the line 28—28 in FIG. 27.
Figure 30:
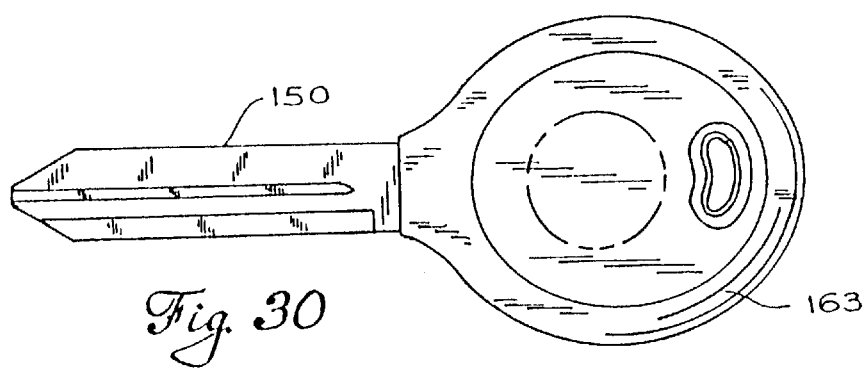
FIG. 30 is a side view of a twelfth embodiment of the key assembly of the present invention.

Referring now to FIGS. 27 and 28, the overmold is illustrated as comprising an outer shell 148 and a generally cylindrical layer 149 which surrounds transponder 2. Outer shell 148 and cylindrical layer 149 thus provides a cushioning layer of material for transponder 2 which aids in preventing the fracture or shattering of transponder 2 should the key assembly be accidentally dropped.

Figure 31:
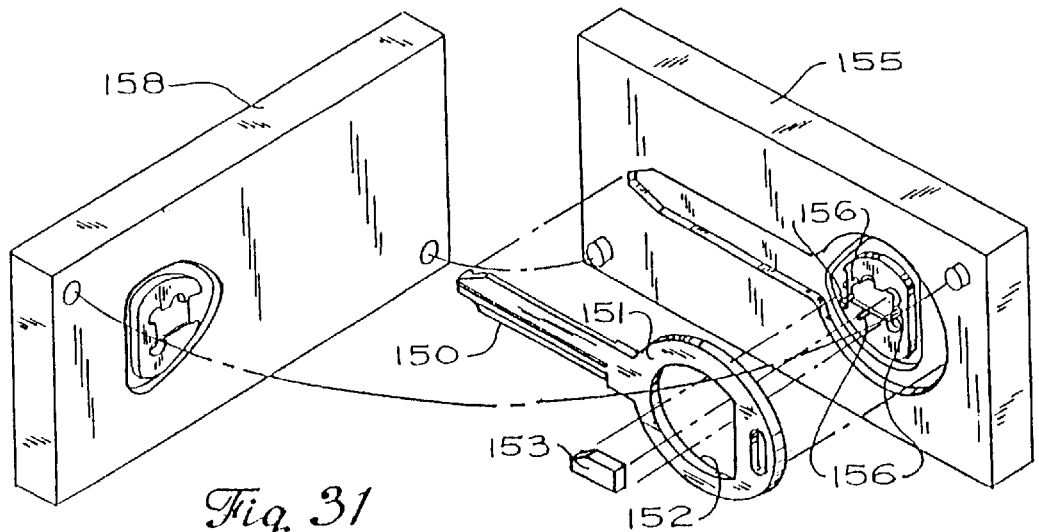
FIG. 31 is an exploded perspective view illustrating a key blank, transponder and mold for forming the carrier for the transponder.
Figure 32:
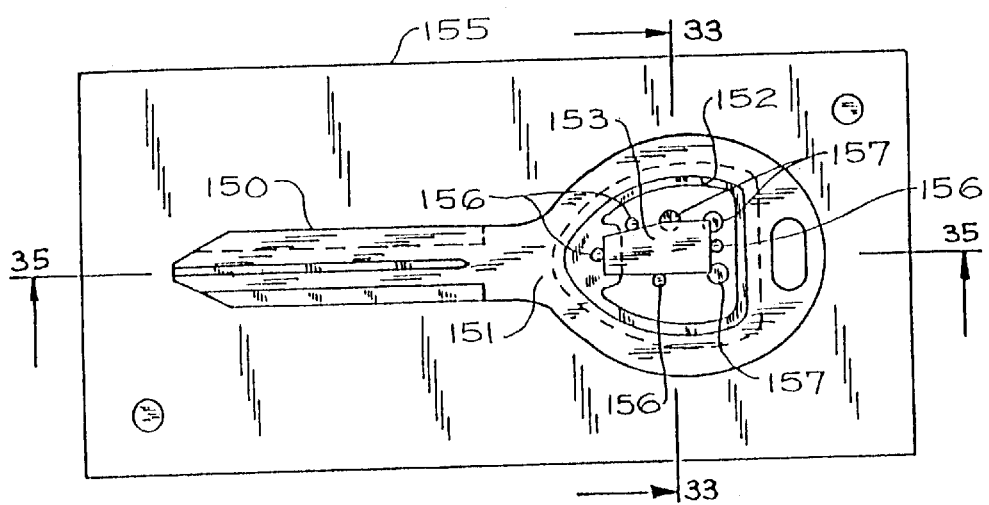
FIG. 32 is a plan view illustrating the key blank and transponder in position just prior to molding the carrier.
Figure 39:
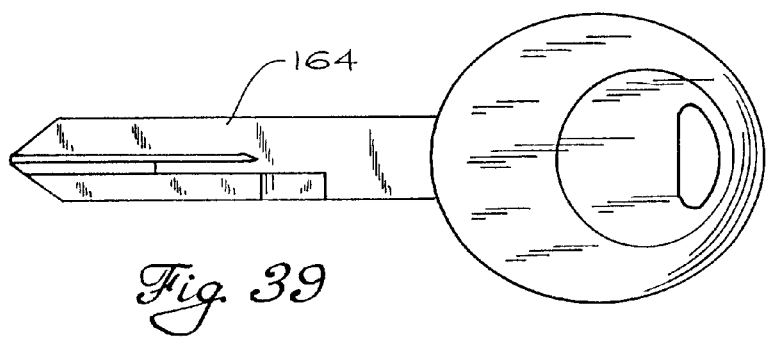
FIG. 39 is a side view of a thirteenth embodiment of the key assembly of the present invention.
Figure 40:
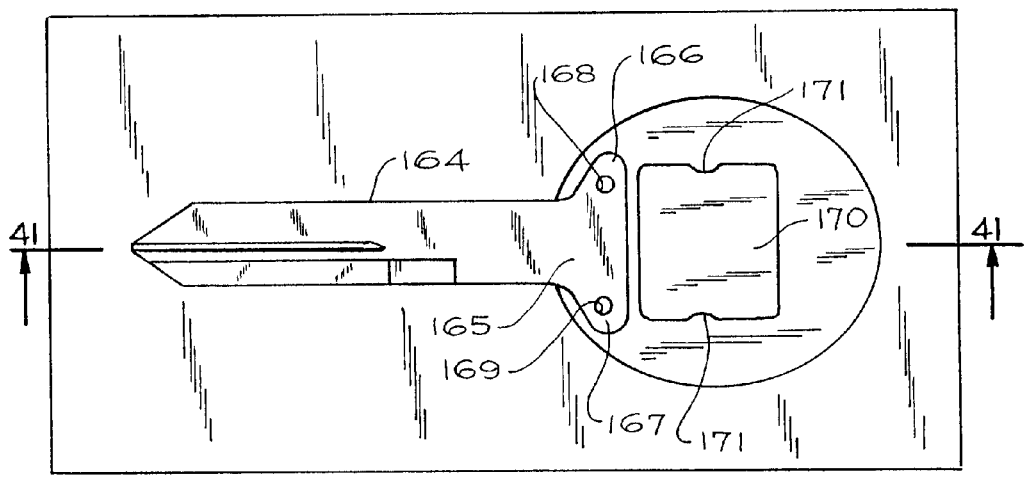
FIG. 40 is a side view of the key blank and transponder within a mold plate prior to molding the carrier for the transponder.
Figure 41:
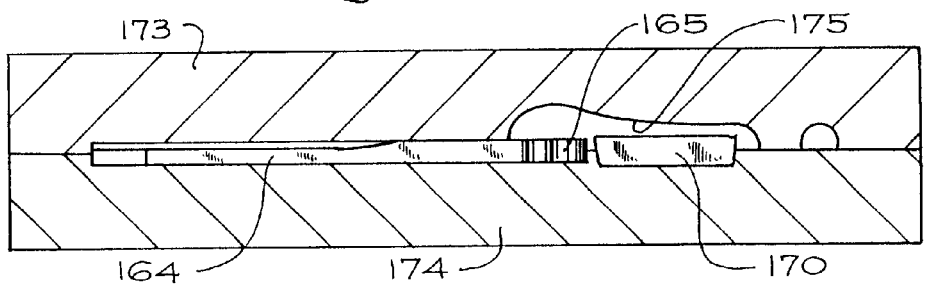
FIG. 41 is a cross-sectional view taken along the plane of the line 41—41 in FIG. 40.
Figure 42:
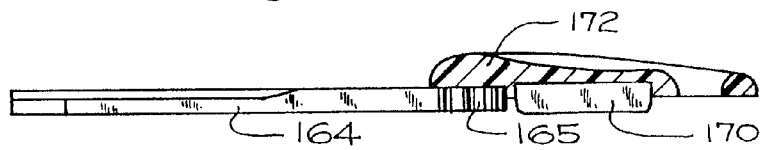
FIG. 42 is a cross-sectional view illustrating the key blank, transponder and carrier for the transponder after molding of the carrier.

Referring now to FIGS. 30–38, there is illustrated a twelfth embodiment of the key assembly of the present invention. In this embodiment, key shank 150 includes a heel end 151 formed as a substantially circular frame member having a central opening 152 for receiving a transponder 153 therein. In this embodiment, transponder 153 is substantially rectangular in shape instead of being cylindrical as in previous embodiments. As shown best in FIGS. 31–36, a carrier 154 is molded around transponder 153 and is simultaneously attached to the cylindrical heel end 151 of the key. In order to accomplish this, the key blank is positioned within a mold plate 155 such that transponder 153 is within central opening 152, as best shown in FIGS. 31 and 32. Transponder 153 is held in positioned by four pins 156 which prevent transponder 153 from moving forwardly, rearwardly, upwardly and downwardly. In order to prevent transponder 153 from moving laterally, a plurality of raised bosses 157 are employed. When a second mold plate 158 is closed to encompass the key blank and transponder 153, as shown in FIG. 33, plastic is injected into the mold to form carrier 154, as shown best in vertical section in FIG. 34 and in longitudinal section in FIG. 36. Thereafter, the key shank 150, heel end 151, transponder 153 and carrier 154 are inserted into a second mold (see FIG. 3) having cavities 159 and 160 formed in corresponding plates 161 and 162. Plastic material is then injected into the mold cavities 159 and 160 to form the overmold or grip portion 163 which surrounds and cushions transponder 153.

Figure 43:
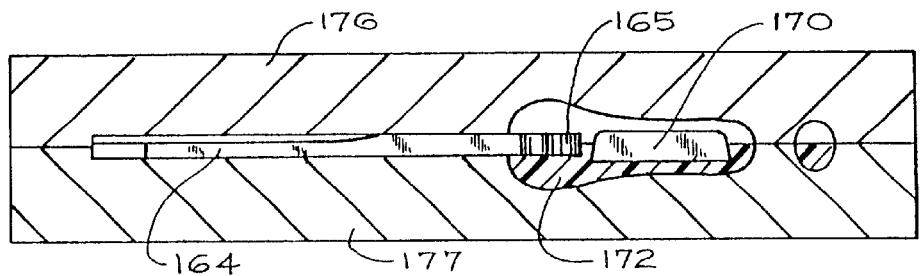
FIG. 43 is a cross-sectional view illustrating the key blank, transponder and carrier inserted within a mold prior to molding the completed key head.
Figure 44:
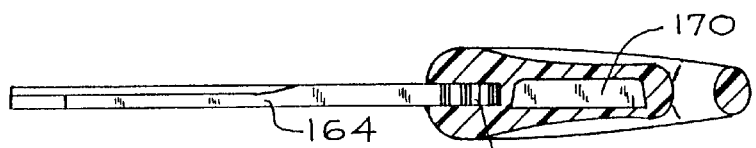
FIG. 44 is a cross-sectional view of a key head illustrating the completely molded head.
Figure 45:
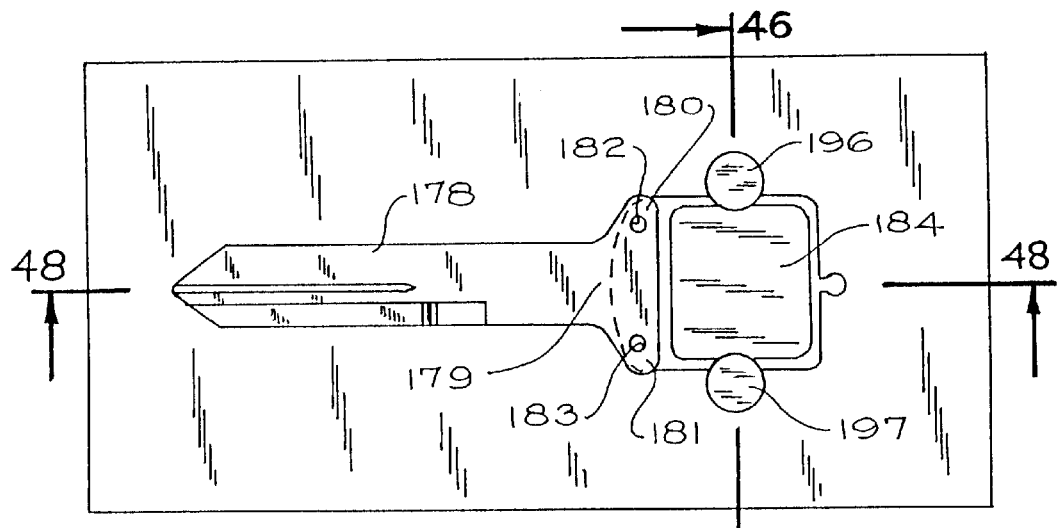
FIG. 45 illustrates a key shank and transponder within a mold prior to molding the carrier for a fourteenth embodiment of the key assembly of the present invention.
Figure 46:
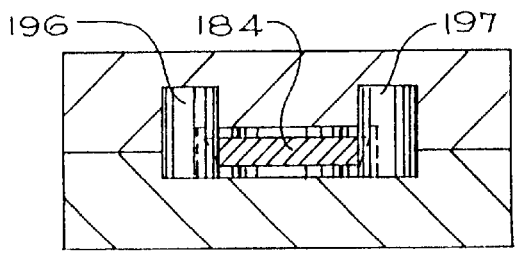
FIG. 46 is a cross-sectional view taken along the lane of the line 46—46 in FIG. 45.
Figure 47:
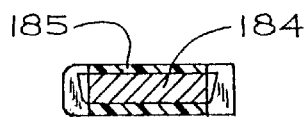
FIG. 47 is a view similar to FIG. 46 illustrating the transponder connected to the key shank by a molded carrier.
Figure 48:
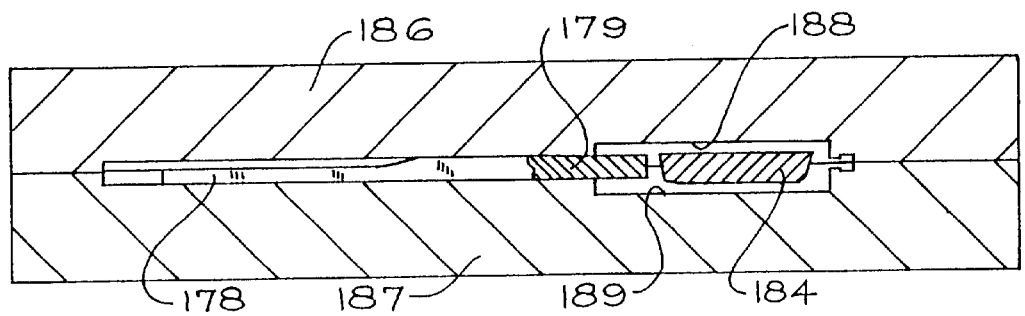
FIG. 48 is a longitudinal cross-sectional view taken along the plane of the line 48–48 in FIG. 45 prior to molding the carrier.

Referring now to FIGS. 39–44, thee is illustrated a thirteenth embodiment of the key assembly of the present invention. In this embodiment, key shank 164 includes a shortened heel end 165 which includes a pair of oppositely extending legs 166, 167 each of which includes a corresponding opening 168, 169 formed therein. In this embodiment, transponder 170 is rectangular in shape and includes a pair of opposite, arcuate-shaped notches 171 formed on the upper and lower edges thereof. As shown best in FIGS. 41 and 42, the edges of transponder 170 are also tapered from one side to the other. In order to attach transponder 170 to heel end 165, a carrier 172 is molded as shown best in FIG. 42. In order to accomplish this, transponder 170 and the key blank is positioned between a pair of mold plates 173 and 174 with mold plate 173 having a cavity 175 formed therein in the shape of one half of the desired configuration for the gripping portion of the key head. After injection of plastic material, transponder 170 and key heel end 165 are attached and simultaneously one half of the gap portion of the key is formed. Transponder 170 is connected to carrier 172 by means of the overmolding of the plastic material over the tapered edges of the transponder 170 so that transponder 170 functions as a tenon while the opening formed in carrier 172 in receive transponder 170 functions as a mortise to join the two components together in a dovetail joint arrangement. Key shank 164 maintains its connection to carrier 172 by means of plastic material flowing into openings 168 and 169 formed in legs 166 and 167 of heel end 165. Thereafter, the other half of the grip portion of the key head is formed by placing carrier 172, transponder 170 and key shank 164 into a mold containing plates 176 and 177 as shown in FIG. 43. After injection of molten plastic and cooling, the completed key is produced as illustrated in FIG. 44.

Figure 49:
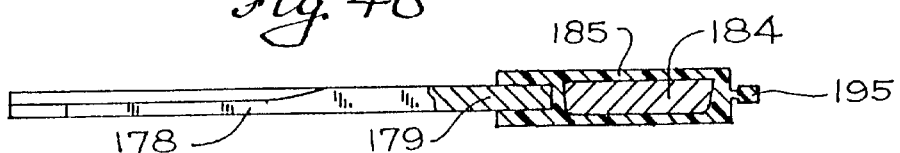
FIG. 49 is a longitudinal view similar to FIG. 48 after molding of the carrier.
Figure 50:
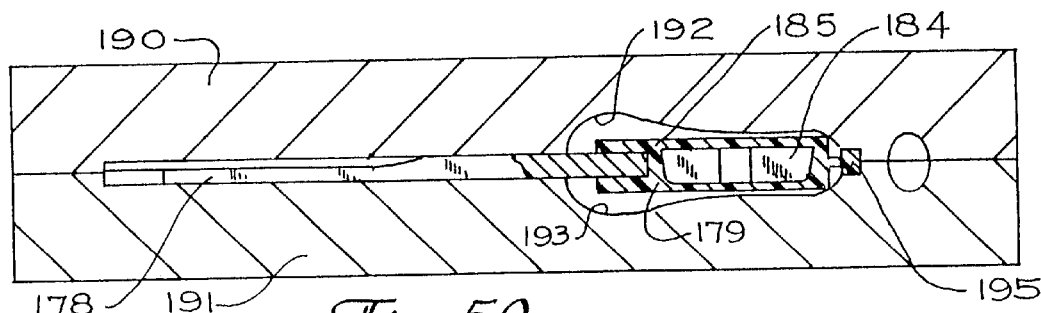
FIG. 50 is a view similar to FIG. 48 showing the key shank, transponder and carrier positioned within a mold prior to overmolding the key head.
Figure 51:
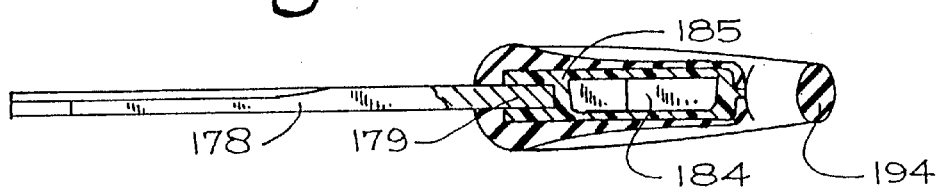
FIG. 51 is a longitudinal cross-sectional view of the key assembly of the fourteenth embodiment.

Referring now to FIGS. 45–51, there is shown a fourteenth embodiment of the key assembly of the present invention. In this embodiment, key shank 178 includes a shortened heel end 179 having opposite legs 180 and 181 with respective openings 182 and 183 formed therethrough similar to the key blank previously described and illustrated with respective to FIG. 40. Transponder 184 has a configuration identical to that described with respect to transponder 170, and is integrally attached to heel end 179 by a molded carrier 185. In other words, carrier 185 is integrally molded around transponder 184 which is held in position in the mold by pins 196 and 197, and is simultaneously attached to heel end 179 via plastic material which fills openings 182 and 183 in a manner similar to that previously described with respect to FIGS. 39–44. In this embodiment, however, the carrier 185 does not comprise both the carrier and grip member for the key, but instead merely functions to interconnected transponder 184 with heel end 179. This is accomplished by placing key shank 178 and transponder 184 within mold plates 186 and 187 and injecting molten plastic material to fill cavities 188 and 189 to form carrier 185, substantially as shown in FIG. 49. When forming carrier 185, a tab 195 is simultaneously formed along the edge of carrier 185 that is opposite key shank 178. Thereafter, key shank 178, transponder 184 and carrier 185 is placed in a second mold including plates 190 and 191 each having formed therein cavities 192 and 193 conforming to the desired shape of the grip portion for the key. Tab 195 functions to properly locate and orientate carrier 185 in the mold. Thereafter, plastic material is injected into cavities 192 and 193 forming an overmold around heel end 179, transponder 184 and carrier 185 to form the grip member 194 for the key, as illustrated in FIG. 51. Tab 195 also functions to prevent carrier 185 from flexing or moving with respect to key shank 178 when filling cavities 192 and 193, and is broken off after the key is completed.

Various modes of carrying out the invention are contemplated as being within the scope of the following claims particularly pointing out and distinctly claiming the subject matter regarded as the invention.

What is claimed is:

1. A method of making a key assembly or a lock, said method comprising the steps of:

providing a key having a heel end;

positioning a transponder adjacent the heel end of said key;

molding a carrier of a first plastic material around said transponder and the heel end of the key to complete the transponder to the heel end of the key and to cover the transponder and the heel end of the key with the first plastic material; and molding a second plastic material over the carrier to form an outer shell over said transponder and the carrier.

2. The method of claim 1, wherein said carrier is molded of a material that is harder than the material of the outer shell.

3. The method of claim 1, wherein the second plastic material is different from the first plastic material.

4. A method of making a key assembly for a lock, said method comprising the steps of:

providing a key having a heel end;

positioning a transponder adjacent the heel end of said key;

molding a carrier of a first plastic material around a portion of said heel end and a portion of said transponder to couple the transponder to the heel and of the key, and to form a portion of a key head for said key assembly; and molding a second plastic material to cover said transponder and said heel end and form the remaining portion of the key head.

5. The method of claim 4, wherein the second plastic material is different from the first plastic material.

6. A method of making a key assembly for a lock, said method comprising the steps of:

providing a key having a heel end;

providing an electronic transponder;

molding a carrier of a first plastic material ones said heel end of said key to mount said electronic transponder to the heel end of said key; and molding an outer shell of a second plastic material, that is different from the first plastic material over said carrier and said transponder.

7. A method of making a key assembly for a lock, said method comprising the steps of:

providing a key including a heel end;

providing a transponder;

molding a carrier of a first material around the transponder and simultaneously attaching the carrier to the heel end of the key to attach the transponder to the heel end of the key; and molding an outer shell of a second material that is different from the first material over the heel end of the key, the carrier and the transponder.

8. A method of making a key assembly for a lock, said method comprising the steps of:

providing a key including a heel end;

providing a transponder;

molding a carrier of a first material that is molded around the transponder and onto the heel end of the key to couple the transponder to the heel end of the key; and molding an outer shell of a second material that is different from the first material over the heel end of the key, the carrier and the transponder.

9. A method of making a key assembly for a lock, said method comprising the steps of:

providing a key including a heel end;

providing a transponder;

molding a carrier of a first plastic material over the heel end of the key and the transponder to mount the transponder to the heel end of the key, with the carrier being attached to the heel end of the key, and the carrier coupling the transponder to the heel end of the key; and molding an outer shell of a second plastic material that is different from the first material over the heel end of the key, the carrier and the transponder.

10. The method of claim 9, including molding the outer shell and the carrier to form a key head for the key.

11. A method of making a key assembly for a lock, said method comprising the steps of:

providing a key having a heel end;

positioning a transponder adjacent the heel end of said key;

molding a carrier of a first plastic material around said transponder and the heel end of the key in a first molding step to couple the transponder to the heel end of the key; and molding a second plastic material over the carrier in a second molding step which is performed subsequent to the first molding step to form an outer shell over said transponder and the carrier.

12. The method of claim 11, wherein said carrier is molded of a material that is harder than the material of the outer shell.

13. The method of claim 11, wherein the second plastic material is different from the first plastic material.

* * * * *